United States Patent
Lee et al.

(10) Patent No.: US 9,470,275 B2
(45) Date of Patent: Oct. 18, 2016

(54) WEDGE CLUTCH WITH A SEGMENTED WEDGE ELEMENT AND CHAMFERED ENGAGEMENT SURFACES

(71) Applicant: Schaeffler Technologies GmbH & Co. KG, Herzogenaurach (DE)

(72) Inventors: Brian Lee, York, SC (US); Carsten Ohr, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 53 days.

(21) Appl. No.: 14/553,258

(22) Filed: Nov. 25, 2014

(65) Prior Publication Data
US 2015/0152922 A1    Jun. 4, 2015

Related U.S. Application Data
(60) Provisional application No. 61/911,239, filed on Dec. 3, 2013.

(51) Int. Cl.
| | |
|---|---|
| F16D 13/14 | (2006.01) |
| F16D 13/04 | (2006.01) |
| F16D 13/16 | (2006.01) |
| F16D 15/00 | (2006.01) |
| F16D 41/07 | (2006.01) |
| F16D 13/22 | (2006.01) |

(52) U.S. Cl.
CPC .............. *F16D 13/14* (2013.01); *F16D 13/04* (2013.01); *F16D 13/16* (2013.01); *F16D 13/22* (2013.01); *F16D 15/00* (2013.01)

(58) Field of Classification Search
CPC ........ F16D 13/14; F16D 13/04; F16D 13/16; F16D 13/22; F16D 15/00; F16D 41/07; F16D 13/12; F16D 13/18
See application file for complete search history.

(56) References Cited

U.S. PATENT DOCUMENTS

| | | | |
|---|---|---|---|
| 827,475 A | * | 7/1906 | Sturtevant ............... F16D 13/12 192/78 |
| 4,537,296 A | | 8/1985 | Lech, Jr. et al. |
| 5,067,598 A | | 11/1991 | Ritter et al. |
| 2014/0025248 A1 | | 1/2014 | Angrick et al. |

FOREIGN PATENT DOCUMENTS

| | | |
|---|---|---|
| JP | 2001304287 | 10/2001 |
| KR | 1020100113838 | 9/2012 |
| WO | 2010005795 | 1/2010 |

OTHER PUBLICATIONS
U.S. Appl. No. 14/490,194, filed Sep. 18, 2014.

\* cited by examiner

*Primary Examiner* — Jacob S Scott
*Assistant Examiner* — Tinh Dang
(74) *Attorney, Agent, or Firm* — Simpson & Simpson, PLLC (57) ABSTRACT

A wedge clutch, including: an inner and outer hubs; a wedge element including separate circumferentially disposed segments radially located between the inner and outer hubs; an outer ring; and first and second displacement elements. The ring is radially located between the wedge element and the outer hub and is non-rotatably connected to the segments and urges the segments radially inward into contact with the inner hub. For a closed mode, the first displacement element is arranged to urge the wedge element in a first axial direction, parallel to an axis of rotation for the wedge clutch, to non-rotatably connect the inner and outer hubs, the wedge element, and the outer ring. For an open mode, the second displacement element is arranged to displace the wedge element in a second axial direction, opposite the first axial direction, to enable relative rotation between the inner and outer hubs.

19 Claims, 5 Drawing Sheets

WEDGE CLUTCH WITH A SEGMENTED WEDGE ELEMENT AND CHAMFERED ENGAGEMENT SURFACES

CROSS-REFERENCE TO RELATED APPLICATIONS

This application claims the benefit under 35 U.S.C. §119 (e) of U.S. Provisional Patent Application No. 61/911,239, filed Dec. 3, 2013, which application is incorporated herein by reference in its entirety.

TECHNICAL FIELD

The present disclosure relates to a wedge clutch using an axially displaceable and circumferentially segmented wedge element to lock inner and outer hubs. In particular, the clutch eliminates torque drag between the inner and outer hubs in a free-wheel mode while enabling rapid and consistent switching to a locking mode from the free-wheel mode. The use of a segmented wedge element, rather than a single-piece wedge plate enables an increase in the thickness of the wedge element and subsequent increase in the torque carrying capacity of the clutch.

BACKGROUND

Wedge clutches are used to connect and disconnect inner and outer hubs. Typically, tapered inner and outer circumferential surfaces for a wedge element are engaged with respective circumferential surfaces of the inner and outer hubs in a connect mode for the clutch. However, under high torque load, one of the inner or outer circumferential surfaces for a wedge element may slip with respective to the circumferential surface of the inner or outer hub, respectively.

SUMMARY

According to aspects illustrated herein, there is provided a wedge clutch, including: an inner hub; an outer hub; a wedge element including a plurality of separate circumferentially disposed segments located radially between the inner and outer hubs; an outer ring; and first and second displacement elements. The ring is disposed radially between the wedge element and the outer hub, is non-rotatably connected to the plurality of segments and urges the plurality of segments radially inward. The first displacement element is engaged with the wedge element. For a closed mode for the wedge clutch, the first displacement element is arranged to urge the wedge element in a first axial direction, parallel to an axis of rotation for the wedge clutch, to non-rotatably connect the inner and outer hubs, the wedge element, and the outer ring. For an open mode for the wedge clutch, the second displacement element is arranged to displace the wedge element in a second axial direction, opposite the first axial direction, to enable relative rotation between the inner and outer hubs.

According to aspects illustrated herein, there is provided a wedge clutch, including: an inner hub; an outer hub; a wedge element including a plurality of separate circumferentially disposed segments located radially between the inner and outer hubs, each segment including a respective outer circumferential surface sloping radially inward in a first axial direction parallel to an axis of rotation for the wedge clutch; an outer ring disposed radially between the wedge element and the outer hub, non-rotatably connected to the plurality of segments, including an inner circumferential surface sloping radially inward in the first axial direction, and urging the plurality of segments radially inward into contact with the inner hub; a first displacement element engaged with the wedge element; and a second displacement element. For a closed mode for the wedge clutch, the first displacement element is arranged to urge the wedge element in the first axial direction to non-rotatably connect the inner and outer hubs, the wedge element, and the outer ring. For an open mode for the wedge clutch, the second displacement element is arranged to displace the wedge element in a second axial direction, opposite the first axial direction, to enable relative rotation between the outer ring and the outer hub.

According to aspects illustrated herein, there is provided a wedge clutch assembly, including: an inner hub; an outer hub including a radially innermost portion with a circumferentially disposed groove including first and second surfaces tapering toward each other in a radially outward direction; a wedge element including a plurality of separate circumferentially disposed segments located radially between the inner and outer hubs; an outer ring disposed radially between the wedge element and the outer hub, non-rotatably connected to the plurality of segments, including a radially outermost portion with third and fourth surfaces tapering toward each other in the radially outward direction, and urging the plurality of segments radially inward into contact with the inner hub; a first displacement element engaged with the wedge element; and a second displacement element. For a closed mode for the wedge clutch, the first displacement element is arranged to urge the wedge element in a first axial direction, parallel to an axis of rotation for the wedge clutch, to non-rotatably connect the inner and outer hubs, the wedge element, and the outer ring. For an open mode for the wedge clutch, the second displacement element is arranged to displace the wedge element in a second axial direction, opposite the first axial direction, to enable relative rotation between the outer hub and the outer ring.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
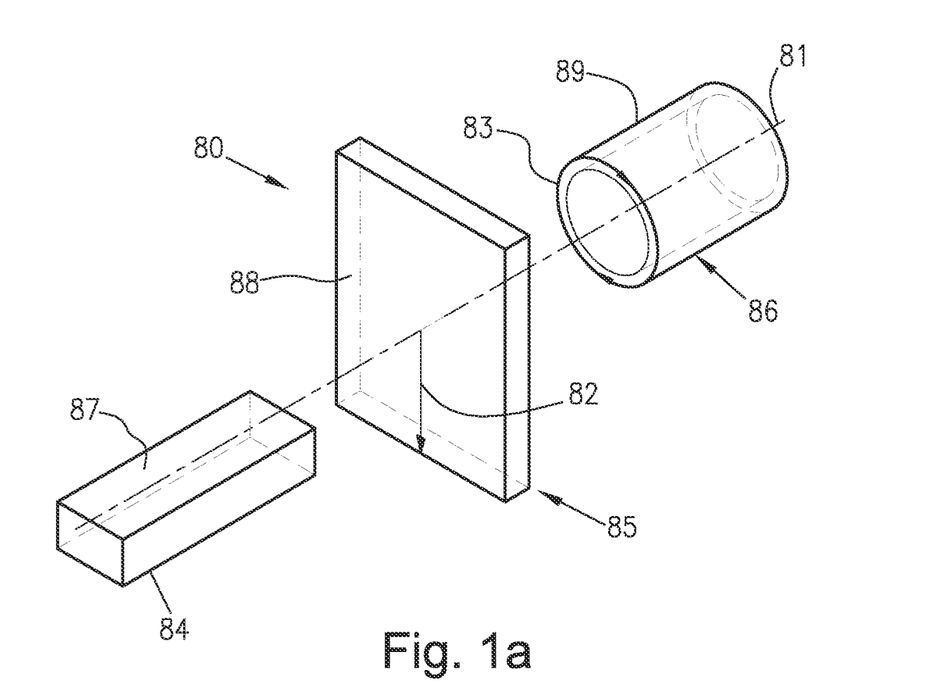
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumferential surface 83, respectively.

The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumferential surface 83 forms a line along the surface. As a further example, axial movement or disposition is parallel to axis 81, radial movement or disposition is parallel to radius 82, and circumferential movement or disposition is parallel to circumferential surface 83. Rotation is with respect to axis 81.

The adverbs "axially," "radially," and "circumferentially" are with respect to an orientation parallel to axis 81, radius 82, or circumferential surface 83, respectively. The adverbs "axially," "radially," and "circumferentially" also are regarding orientation parallel to respective planes.

Figure 1B:
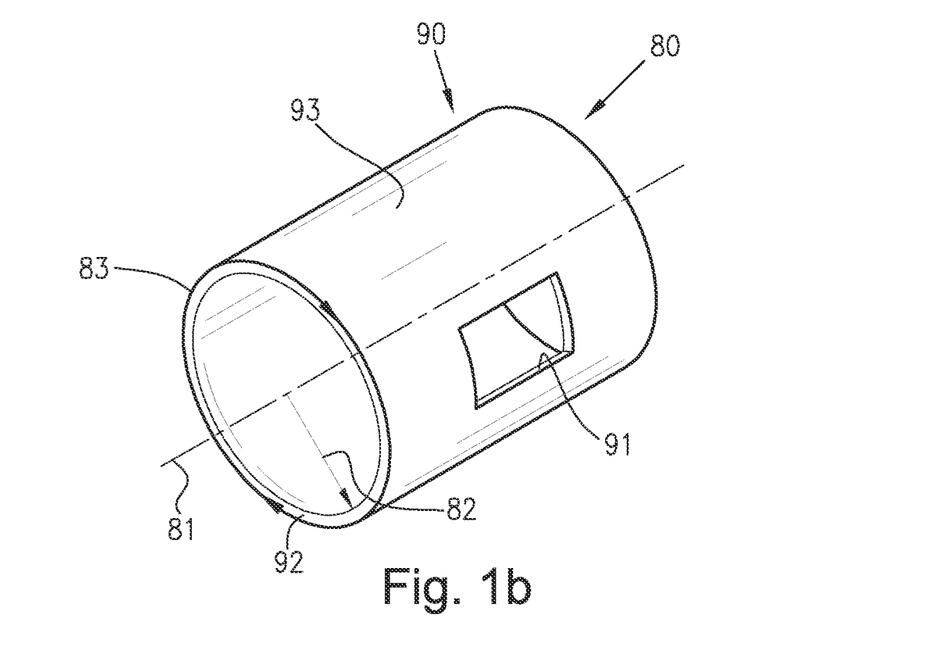
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
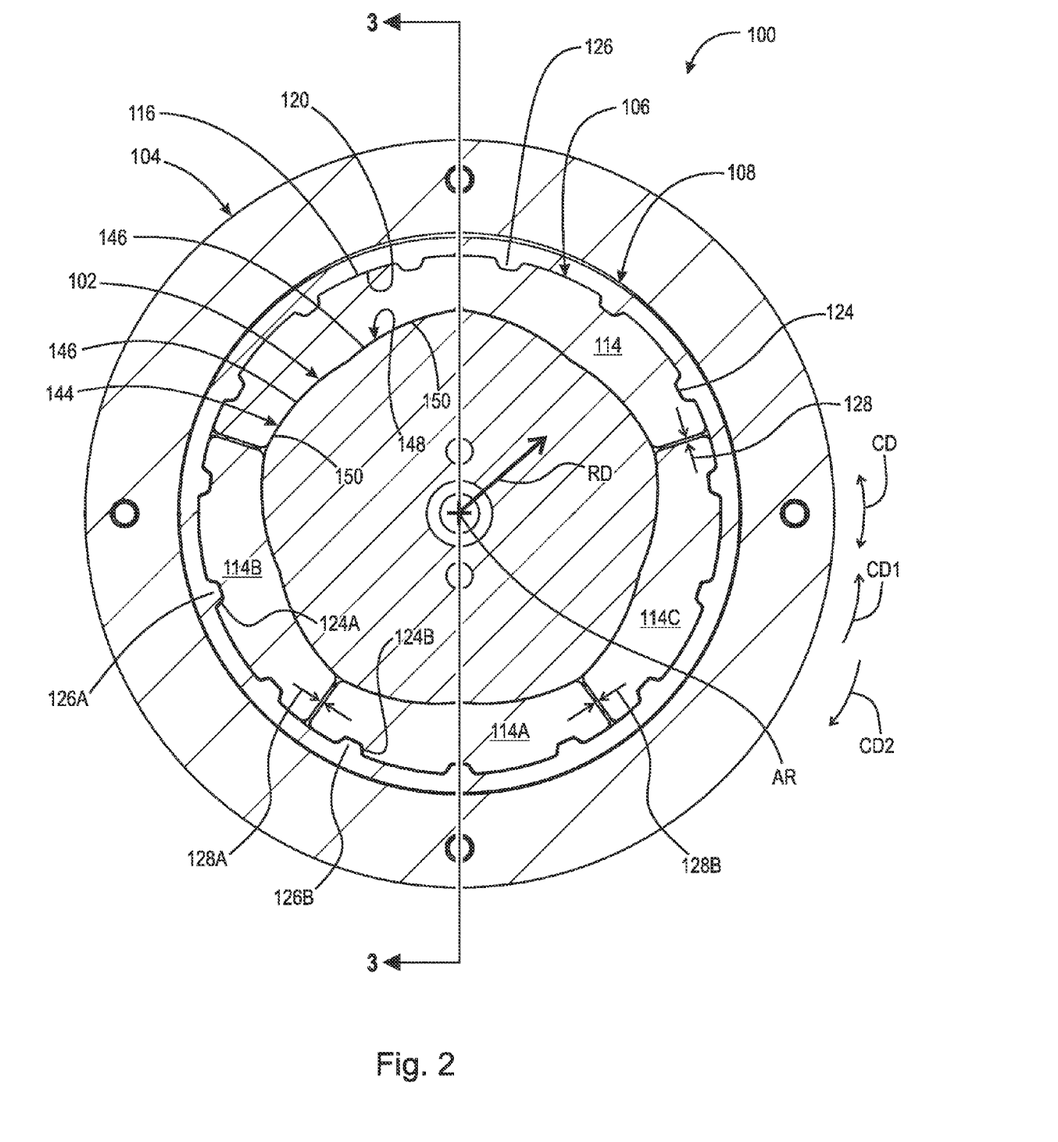
FIG. 2 is a front view of a wedge clutch with a segmented wedge element and chamfered engagement surfaces.

FIG. 2 is a front view of wedge clutch 100 with a segmented wedge element and chamfered engagement surfaces.

Figure 3:
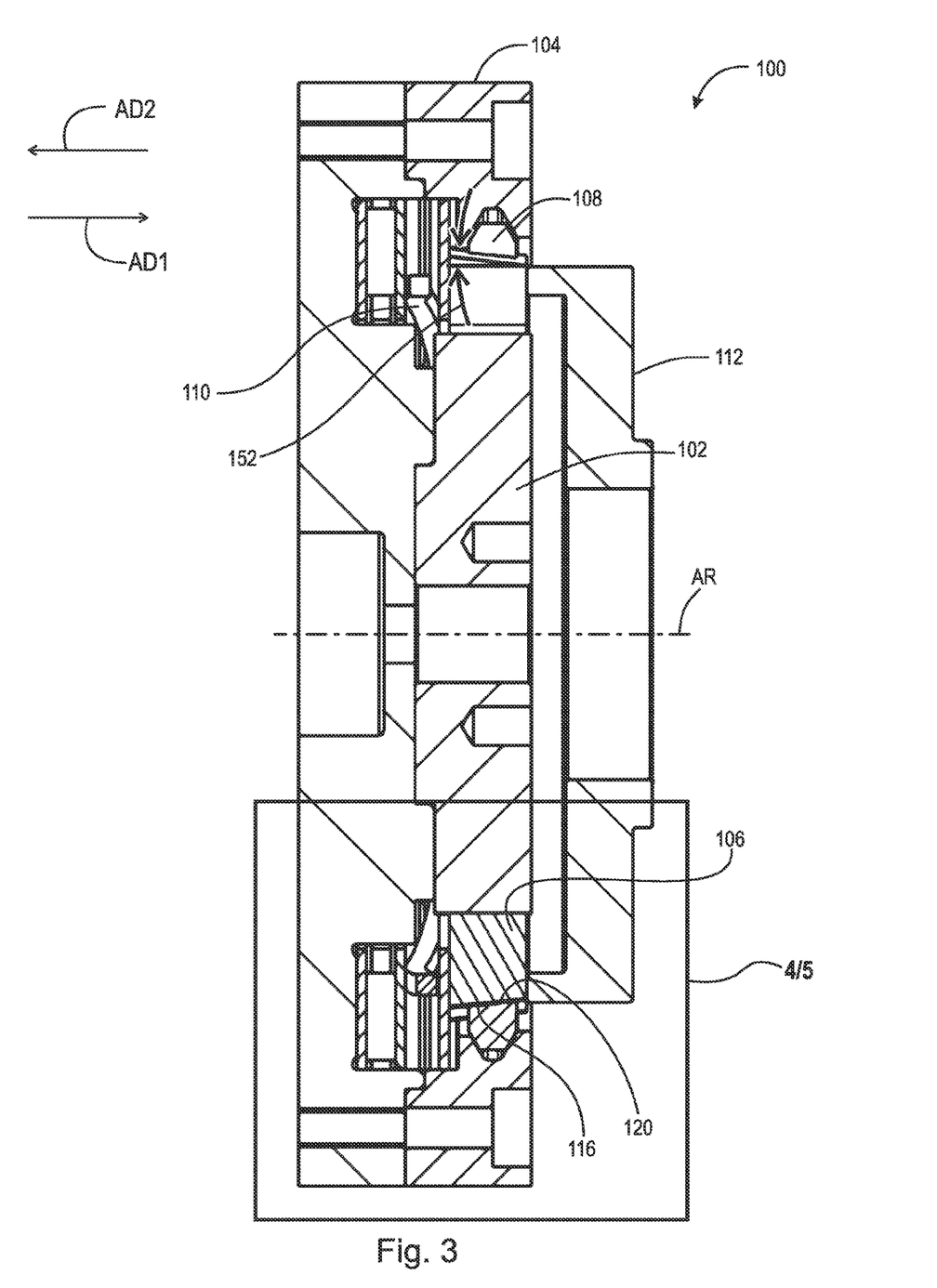
FIG. 3 is a cross-sectional view generally along line 3-3 in FIG. 2.

FIG. 3 is a cross-sectional view of wedge clutch 100 generally along line 3-3 in FIG. 2.

Figure 4:
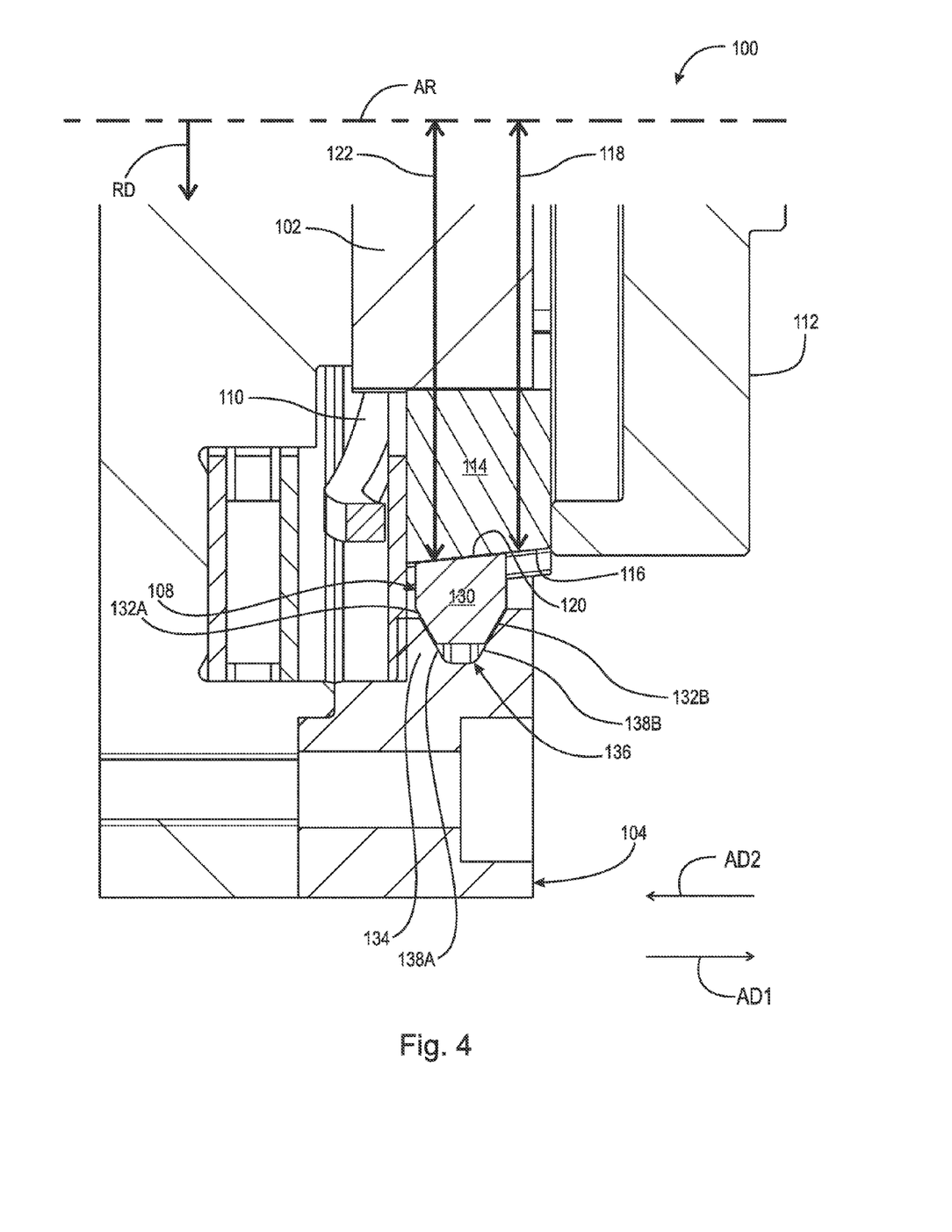
FIG. 4 is a detail of area 4/5 in FIG. 3 showing the wedge clutch in a closed mode; and, FIG. 5 is a detail of area 4/5 in FIG. 3 showing the wedge clutch in an open mode.

FIG. 4 is a detail of area 4/5 in FIG. 3 showing wedge clutch 100 in a closed mode.

Figure 5:
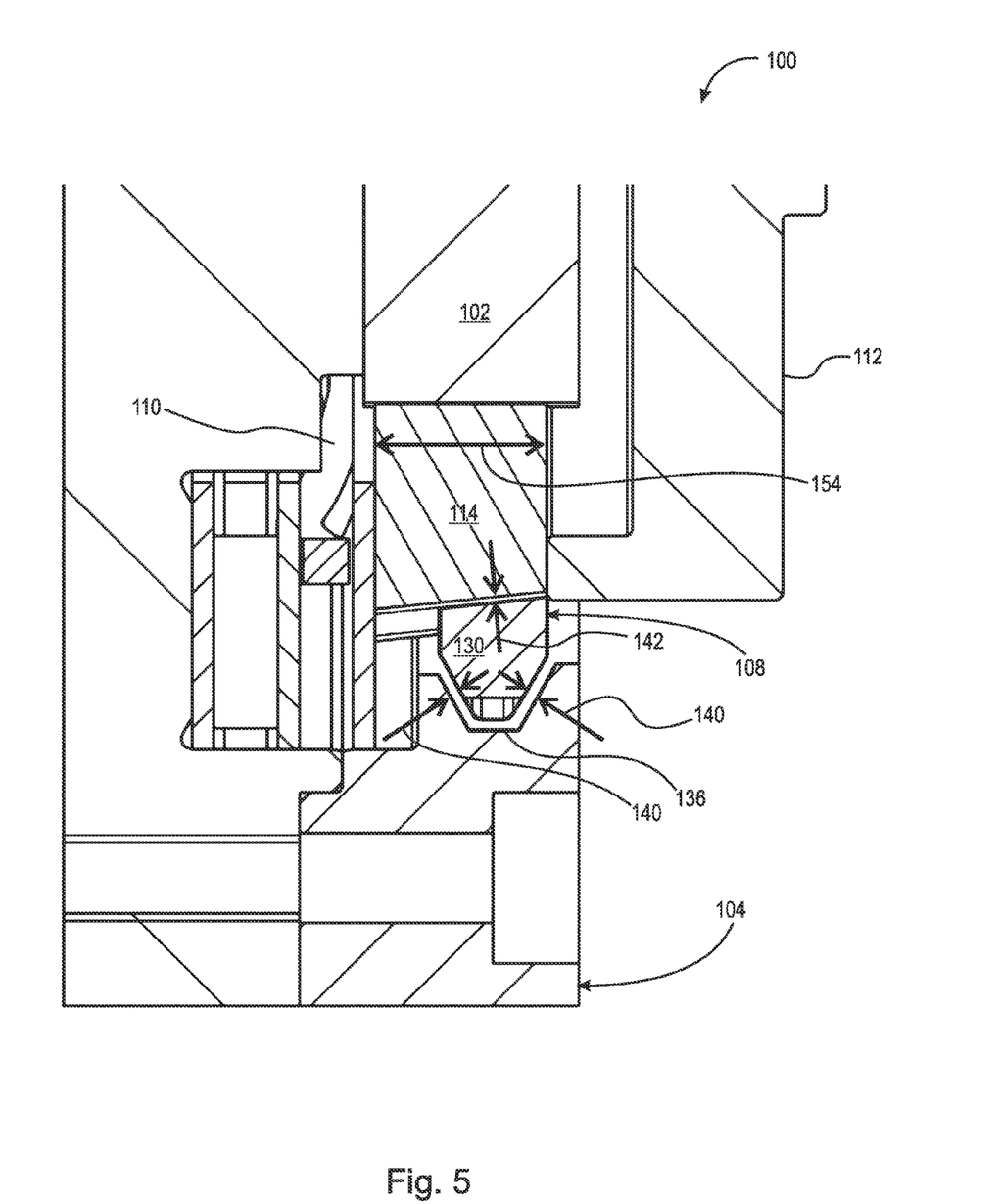

FIG. 5 is a detail of area 4/5 in FIG. 3 showing wedge clutch 100 in an open mode. The following should be viewed in light of FIGS. 2 through 5. Wedge clutch 100 includes inner hub 102, outer hub 104, wedge element 106, outer ring 108, and displaceable elements 110 and 112. Wedge element 106 includes separate, circumferentially disposed segments 114 located radially between hubs 102 and 104, in particular, between hub 102 and ring 108. Outer ring 108 is disposed radially between the wedge element and outer hub 104, is non-rotatably connected to segments 114, and urges segments 114 radially inward into contact with inner hub 102. As a result of the contact with hub 102, wedge element 106 rotates with hub 102 except as noted below.

To initiate a closed mode for wedge clutch 100, in which inner hub 102 and outer hub 104 are non-rotatably connected, displacement element 110 is arranged to urge wedge element 106 in axial direction AD1 parallel to axis of rotation AR for the wedge clutch, to non-rotatably connect the inner and outer hubs, the wedge element, and the outer ring. To initiate an open mode for wedge clutch 100, in which relative rotation between inner hub 102 and outer hub 104 is enabled, displacement element 112 is arranged to displace the wedge element in axial direction AD2, opposite AD1, for example, enabling relative rotation between outer ring 108 and outer hub 104.

Each segment 114 includes a respective outer circumferential surface 116 sloping radially inward in axial direction AD1. That is, radial distance 118 of surface 116 from axis AR increases in direction AD1. Ring 108 includes inner circumferential surface 120 sloping radially inward in axial direction AD1. That is, radial distance 122 of surface 120 from axis AR increases in direction AD1.

In an example embodiment, each outer circumferential surface 116 includes at least one radially inwardly extending indent 124, and inner circumferential surface 120 includes radially inwardly extending protrusions 126 at least partially disposed in indents 124 to non-rotatably connect said each segment 114 to ring 108. Ring 108 also holds segments 114 in circumferential orientation. For example, protrusions 126 are arranged to hold each segment 114 such that each segment 114 is separated by respective spaces 128 in circumferential direction CD from circumferentially adjacent segments 114. For example, segment 114A is separated from segments 114B and 114C by circumferential spaces 128A and 128B, respectively. For example, contact between protrusions 126A and indents 124A and between protrusions 126B and indents 124B maintains space 128A. Maintaining spaces 128 ensures that segments 114 are able to displace axially and radially (to enable the open and closed modes) without contacting each other and obstructing such displacement.

Ring 108 includes radially outermost portion 130 with chamfered surfaces 132A and 132B tapering toward each other in radially outward direction RD. Hub 104 includes radially innermost portion 134 with a circumferentially disposed groove 136 including chamfered surfaces 138A and 138B tapering toward each other direction RD. Stated otherwise, portion 130 and groove 136 are complimentarily chamfered. In an example embodiment, surfaces 132A and 138A are substantially parallel to each other and surfaces 132B and 138B are substantially parallel to each other.

In an example embodiment, portions 130 and 134 are free of contact in the open mode, for example, gaps 140 are present between surfaces 132A and 138A and between surfaces 132B and 138B. In an example embodiment, portions 130 and 134 are only in nominal contact in the open mode. In an example embodiment, in the open mode, gap 142 between segments 114 and ring 108 is present as well as gaps 140. In response to displacement element 110 displacing wedge element 106 in axial direction AD1, outer ring 108 is arranged to expand radially outward in direction RD to engage surface 132A with surface 138A and to engage surface 132B with surface 138B, causing wedge element 106 to rotate with respect to inner hub 102 (initiation of the closed mode) before hubs 102 and 104 are non-rotatably engaged.

In an example embodiment, displacement element 110 is any resilient element known in the art and displacement element 112 is any piston known in the art. In an example embodiment (not shown), displacement element 112 is any resilient element known in the art and displacement element 110 is any piston known in the art. Any means known in the art can be used to displace a piston in clutch 100 including, but not limited to, hydraulic, pneumatic, or electrical actuation.

In an example embodiment, each segment 114 includes inner circumferential surface 144 with circumferentially sloping ramps 146 and inner hub 102 includes outer circumferential surface 148 with circumferential sloping ramps 150 engaged with circumferentially sloping ramps 146. In response to displacement of the wedge element in axial direction AD1 ramps 146 and 150 are arranged to slide across each other to urge segments 114 radially outward. In response to displacement of the wedge element axial direction AD2, ramps 146 and 150 are arranged to slide across each other to enable ring 108 to displace segments 114 radially inward (segments 114 contract radially inward) to reduce or break contact between ring 108 and hub 104.

The following provides further detail regarding the structure and function of clutch 100. In general, switching between the open and closed modes of clutch 100 requires relative rotation between hubs 102 and 104. In the open mode for clutch 100, surfaces 132A and 138A and surfaces 132B and 138B are either free of contact or contact is minimal such that the contact does not cause ring 108 to rotate with hub 104. To switch from the open mode to the closed mode, displacement element 110 displaces wedge element in direction AD1, causing sloped surface 116 to slide along surface 120, pushing ring 108 radially outward to either engage surfaces 132A and 138A and surfaces 132B and 138B or increase frictional force between surfaces 132A and 138A and surfaces 132B and 138B. As a result, ring 108 and wedge element 106 rotate with hub 104 and with respect to hub 102. This relative rotation causes ramps 146 and 150 to slide across each other such that ramps 146 push ramps 150 (and ring 108) radially outward to non-rotatably connect ring 108 and hub 104.

The relative rotation between inner hub 102 and outer hub 104 to switch between open and closed modes can be in circumferential direction CD1 or CD2, due to the configuration of ramps 142 and 150. That is, to switch to the closed mode, relative rotation of inner hub 102 and outer hub 104 in either of directions CD1 or CD2 causes ramps 146 and 150 to slide across each other and expand the wedge element radially outward. It should be understood that the relative rotation between inner hub 102 and outer hub 104 can include inner hub 102 and outer hub 104 rotating in the same circumferential direction but at different speeds, or in opposite circumferential directions. The relative rotation between inner hub 102 and outer hub 104 also can include one of inner hub 102 or outer hub 104 not rotating.

In the closed mode, surfaces 132A and 138A and surfaces 132B and 138B are non-rotatably connected. To switch from the closed mode to the open mode, displacement element 112 displaces wedge element in direction AD2, causing sloped surface 116 to slide along surface 120, enabling ring 108 to contract radially inward creating gap 140, which in turn removes contact between ring 108 and hub 104 or reduces frictional force between ring 108 and hub 104. The removal of contact or reduction of frictional force, in concert with the radially inward force from ring 108 on segments 114 causes ramps 146 and 150 to slide across each other such that wedge element 106 displaces radially inward.

In an example embodiment, clutch 100 is self-locking That is, once surfaces 116 and 120 are non-rotatably engaged in the closed mode, angle 152 of the slope of surfaces 116 and 120 with respect to axis AR and the coefficient of friction between surfaces 116 and 120 is sufficient to maintain the closed mode.

Advantageously, chamfered surfaces 132A/B and 138A/B increase a torque carrying capacity of clutch 100. By forming wedge element 106 of separate segments 114, axial thickness 154 of element 106 can be increased, further increasing the torque carrying capacity of clutch 100. As noted above, ring 108 enables the use of segments 114. Advantageously, in the open mode for clutch 100, element 112 displaces wedge element 106 in direction AD2 so that surfaces 132A and 138A and surfaces 132B and 138B are free of contact or have only nominal contact. Thus, in the open mode, there is little or no drag loss caused by contact between surfaces 132A and 138A and surfaces 132B and 138B. Further, clutch 100 enables rapid and consistent connection of hubs 102 and 104. Resilient element 110 need only apply a relatively small amount of axial force in direction AD1 to displace wedge element 106 a relatively small axial distance to initiate the closed mode.

The self-locking aspect of wedge element 106 and ring 108 ensures a rapid and stable non-rotatable connection of the inner and outer hubs.

As well, due to the self-locking aspect of clutch 100, there is no need for element 110 to apply axial force in direction AD1 to hold the wedge element in the closed position. Thus, there is no need for an active element to provide such force, reducing complexity and energy requirements. Element 110 needs only provide sufficient force to displace the wedge element to initiate or nominally increase contact between ring 108 and the outer hub. As a further result, element 112 does not need to overcome a holding force from an active element 110 to displace the wedge element to initiate the open mode, reducing the energy requirement for element 112.

Surfaces 116 and 120 are shown sloping radially inward in direction AD1; however, it should be understood that the slopes of the surfaces could be reversed such that surfaces 116 and 120 slope radially outward in direction AD1.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:
1. A wedge clutch, comprising:
an inner hub;
an outer hub;
a wedge element including a plurality of separate circumferentially disposed segments located radially between the inner and outer hubs;
an outer ring:
disposed radially between the wedge element and the outer hub;

non-rotatably connected to the plurality of segments; and, urging the plurality of segments radially inward;

a first displacement element; and, a second displacement element, wherein:

for a closed mode for the wedge clutch, the first displacement element is arranged to urge the wedge element in a first axial direction, parallel to an axis of rotation for the wedge clutch, to non-rotatably connect the inner and outer hubs, the wedge element, and the outer ring;

for an open mode for the wedge clutch, the second displacement element is arranged to displace the wedge element in a second axial direction, opposite the first axial direction, to enable relative rotation between the inner and outer hubs; and, in the closed mode for the clutch, frictional force between the outer ring and the outer hub is sufficient to maintain the non-rotatable connection of the outer ring and the outer hub.

2. The clutch of claim 1, wherein for the open mode for the wedge clutch, the second displacement element is arranged to displace the wedge element in a second axial direction, opposite the first axial direction, to enable relative rotation between the outer ring and the outer hub.

3. The clutch of claim 1, wherein:

each segment from the plurality of segments includes a respective outer circumferential surface sloping radially inward in the first axial direction; and, the outer ring includes an inner circumferential surface sloping radially inward in the first axial direction.

4. The clutch of claim 1, wherein:

each segment from the plurality of segments includes a respective outer circumferential surface including at least one radially inwardly extending indent; and, the outer ring includes an inner circumferential surface with a plurality of radially inwardly extending protrusions at least partially disposed in the at least one radially inwardly extending indents to non-rotatably connect said each segment to the outer ring.

5. The clutch of claim 4, wherein the plurality of radially inwardly extending protrusions are arranged to hold said each segment such that said each segment is separated by respective spaces, in a circumferential direction, from circumferentially adjacent segments from the plurality of segments by respective spaces.

6. The clutch of claim 1, wherein:

the outer ring includes a radially outermost portion with first and second surfaces tapering toward each other in a radially outward direction; and, the outer hub includes a radially innermost portion with a circumferentially disposed groove including third and fourth surfaces tapering toward each other in the radially outward direction.

7. The clutch of claim 6, wherein:

the first and third surfaces are substantially parallel to each other; and, the second and fourth surfaces are substantially parallel to each other.

8. The clutch of claim 6, wherein in response to the first displacement element displacing the wedge element in the first axial direction, the outer ring is arranged to expand radially outward to:

non-rotatably connect the first and third surfaces; and, non-rotatably connect the second and fourth surfaces.

9. The clutch of claim 1, wherein:

the first displacement element is a resilient element and the second displacement element is a piston; or, the first displacement element is a piston and the second displacement element is a resilient element.

10. The clutch of claim 1, wherein:

each segment in the plurality of segments includes an inner circumferential surface with a first plurality of circumferentially sloping ramps;

the inner hub includes an outer circumferential surface with a second plurality of circumferential sloping ramps engaged with the first pluralities of circumferentially sloping ramps;

in response to displacement of the wedge element in the first axial direction the respective first pluralities of ramps are arranged to slide across the second plurality of ramps to urge the plurality of segments radially outward; and, in response to displacement of the wedge element in the second axial direction:

the respective first pluralities of ramps are arranged to slide across the second plurality of ramps; and, the outer ring is arranged to contract radially inward to reduce or break contact between the outer ring and the outer hub.

11. A wedge clutch, comprising:

an inner hub;

an outer hub;

a wedge element including a plurality of separate circumferentially disposed segments located radially between the inner and outer hubs, each segment including a respective outer circumferential surface sloping radially inward in a first axial direction parallel to an axis of rotation for the wedge clutch;

an outer ring:

disposed radially between the wedge element and the outer hub;

non-rotatably connected to the plurality of segments;

including an inner circumferential surface sloping radially inward in the first axial direction; and, urging the plurality of segments radially inward into contact with the inner hub;

a first displacement element; and, a second displacement element, wherein:

for a closed mode for the wedge clutch, the first displacement element is arranged to urge the wedge element in the first axial direction to non-rotatably connect the inner and outer hubs, the wedge element, and the outer ring; and, for an open mode for the wedge clutch, the second displacement element is arranged to displace the wedge element in a second axial direction, opposite the first axial direction, to enable relative rotation between the outer ring and the outer hub.

12. The clutch of claim 11, wherein:

each segment from the plurality of segments includes an outer circumferential surface including at least one radially inwardly extending indent; and, the outer ring includes an inner circumferential surface with a plurality of radially inwardly extending protrusions at least partially disposed in the at least one radially inwardly extending indents to non-rotatably connect said each segment to the outer ring.

13. The clutch of claim 12, wherein the plurality of radially inwardly extending protrusions are arranged to hold each segment from the plurality of segments such that said each segment is separated, by respective spaces in a circumferential direction, from circumferentially adjacent segments from the plurality of segments by respective spaces.

14. The clutch of claim 11, wherein:
the outer ring includes a radially outermost portion with first and second surfaces tapering toward each other in a radially outward direction; and,
the outer hub includes a radially innermost portion with a circumferentially disposed groove including third and fourth surfaces tapering toward each other in the radially outward direction.

15. A wedge clutch, comprising:
an inner hub;
an outer hub including a radially innermost portion with a circumferentially disposed groove including first and second surfaces tapering toward each other in a radially outward direction;
a wedge element including a plurality of separate circumferentially disposed segments located radially between the inner and outer hubs;
an outer ring:
  disposed radially between the wedge element and the outer hub;
  non-rotatably connected to the plurality of segments;
  including a radially outermost portion with third and fourth surfaces tapering toward each other in the radially outward direction; and,
  urging the plurality of segments radially inward;
a first displacement element; and,
a second displacement element, wherein:
  for a closed mode for the wedge clutch, the first displacement element is arranged to urge the wedge element in a first axial direction, parallel to an axis of rotation for the wedge clutch, to non-rotatably connect the inner and outer hubs, the wedge element, and the outer ring; and,
  for an open mode for the wedge clutch, the second displacement element is arranged to displace the wedge element in a second axial direction, opposite the first axial direction, to enable relative rotation between the outer hub and the outer ring.

16. The clutch of claim 15, wherein:
the first and third surfaces are substantially parallel to each other; and,
the second and fourth surfaces are substantially parallel to each other.

17. The clutch of claim 16, wherein in response to the first displacement element displacing the wedge element in the first axial direction the outer ring is arranged to expand radially outward to:
non-rotatably connect the first and third surfaces; and,
non-rotatably connect the second and fourth surfaces.

18. The clutch of claim 15, wherein:
each segment from the plurality of segments includes a respective outer circumferential surface sloping radially inward in the first axial direction;
the outer ring includes an inner circumferential surface sloping radially inward in the first axial direction.

19. The clutch of claim 15, wherein:
each segment from the plurality of segments includes an outer circumferential surface including at least one radially inwardly extending indent;
the outer ring includes an inner circumferential surface with a plurality of radially inwardly extending protrusions at least partially disposed in the at least one radially inwardly extending indents to non-rotatably connect said each segment to the outer ring; and,
the plurality of radially inwardly extending protrusions are arranged to hold each segment from the plurality of segments such that said each segment is separated, by respective spaces in a circumferential direction, from circumferentially adjacent segments from the plurality of segments by respective spaces.

* * * * *